Figure 1:
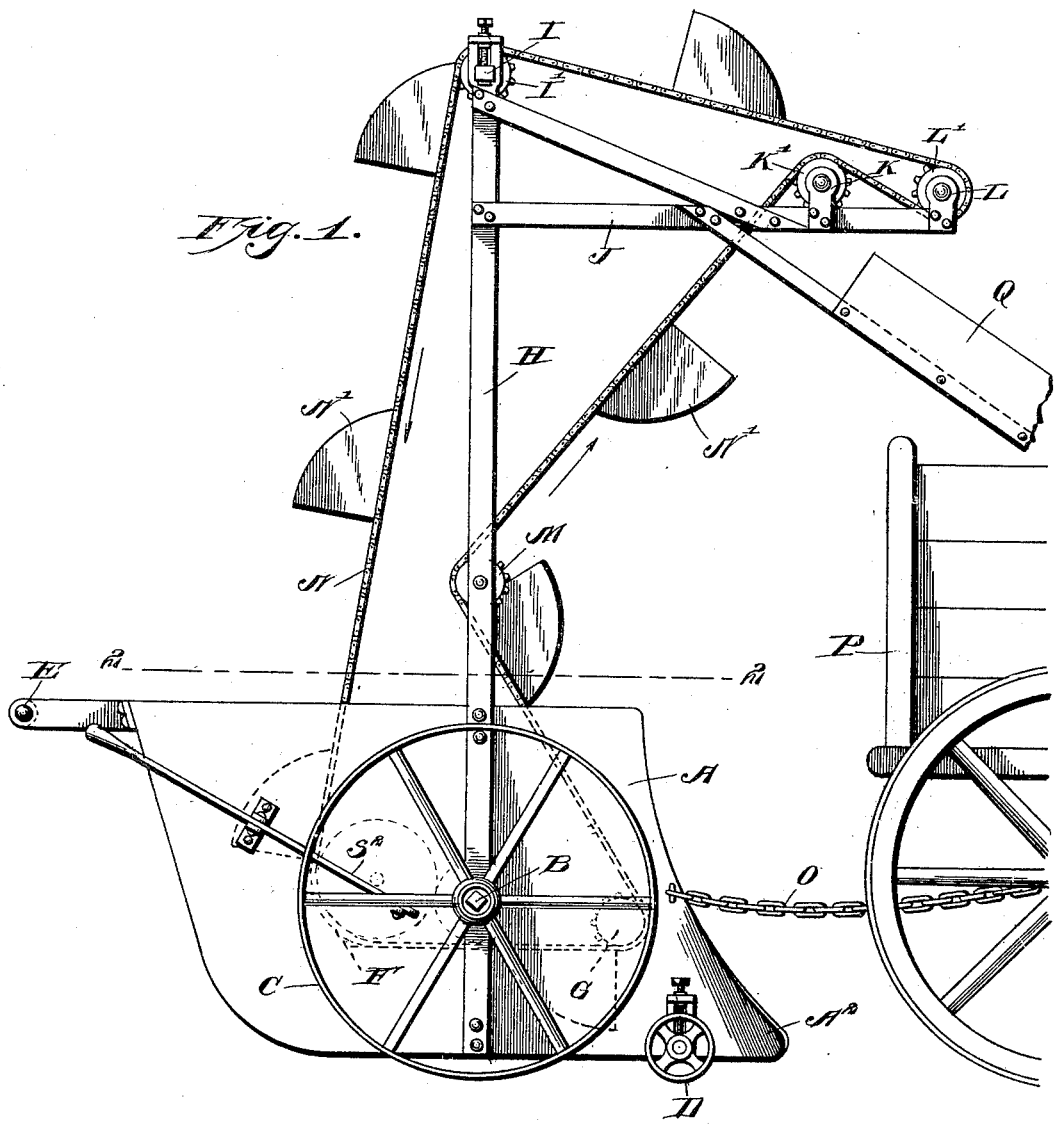

No. 697,243. Patented Apr. 8, 1902.
A. GEHRINGER.
CART SHOVEL AND SCRAPER.
(Application filed June 11, 1901.)
(No Model.) 2 Sheets—Sheet 1.

Witnesses:
Louis D. Heinrichs
L. H. Morrison

Inventor
Adam Gehringer
By
W. Preston Williamson
Atty

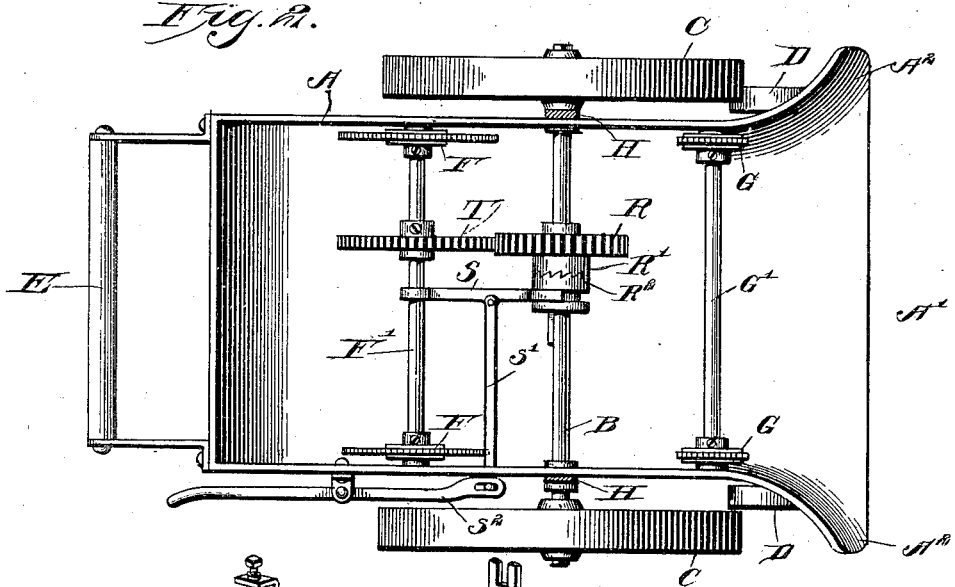
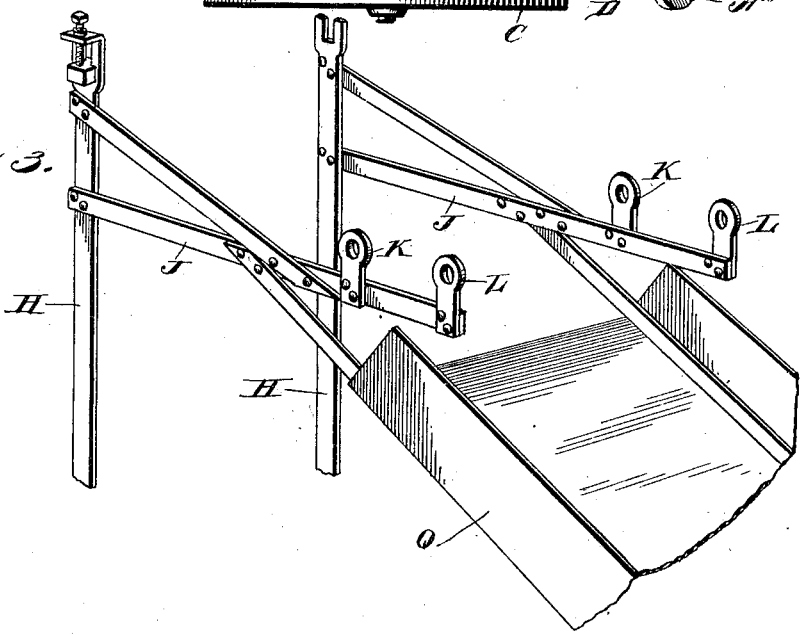

UNITED STATES PATENT OFFICE.

ADAM GEHRINGER, OF PHILADELPHIA, PENNSYLVANIA.

CART SHOVEL AND SCRAPER.

SPECIFICATION forming part of Letters Patent No. 697,243, dated April 8, 1902.

Application filed June 11, 1901. Serial No. 64,085. (No model.)

*To all whom it may concern:*

Be it known that I, ADAM GEHRINGER, a citizen of the United States, residing at Philadelphia, county of Philadelphia, and State of Pennsylvania, have invented a certain new and useful Improvement in Cart Shovels and Scrapers, of which the following is a specification.

My invention relates to a new and useful improvement in cart shovels and scrapers, and is an improvement upon my patent, Serial No. 41,253, which was allowed February 4, 1901, and has for its object to provide a shovel and scraper wherein the dirt after it has been scraped up is carried upward by a series of buckets and deposited in a cart in front of the scraper, and this cart also being secured to the scraper furnishes motive power for the same.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of my invention, showing the rear end of a cart to which it is attached. Fig. 2 is a section on the line 2 2 of Fig. 1; and Fig. 3, a perspective view of the upper part of the framework, showing the chute attached thereto.

In carrying out my invention as here embodied, A represents a shovel or scraper, which is mounted upon the axle B.

C C are two large traction-wheels which are secured to the outer ends of the axle B on each side of the shovel A. The wheels C may or may not have projections on the edge to prevent the slipping of the wheels. The shovel or scraper A consists of the nose A', which is adapted to do the scraping or excavating. This nose A' is wider than the rest of the shovel and extends out, as shown in Fig. 2, at the points A², so that the dirt will be scraped or excavated from the front of the wheels C.

D D are two small wheels journaled upon studs extending out from the sides of the shovel A, and these wheels D lie behind the flared portions A². These wheels are for the purpose of holding the shovel level, so that the nose of the shovel will not dig too deep in the ground. To the rear portion of the shovel is attached a handle E for the purpose of guiding the shovel as it travels forward.

F represents two sprocket-wheels secured upon the shaft F', which is journaled in bearings located upon the inside of the sides of the shovel A.

G represents two sprocket-wheels also secured to a shaft G', which is journaled upon the inside of the sides of the shovel A.

H represents two uprights secured to the shovel A and extending upward therefrom. In the upper ends of these uprights is journaled a shaft I, to which are secured the sprocket-wheels I'.

J represents braced arms which are secured to the uprights H and extend forward from the same.

K and L are studs secured to the forward end of the arms J, and the stud K has sprocket-wheels K' journaled thereon, and the stud L has the sprocket-wheels L' journaled thereon.

M represents sprocket-wheels which are journaled in the upright at a point between the top of the shovel and the upper end of the upright.

N represents endless link chains which pass around and underneath the sprocket-wheels G and F, upward and over the sprocket-wheels I', around and under the sprocket-wheels L', over the sprocket-wheels K', downward and around the sprocket-wheels M, back to the sprocket-wheels G. These chains travel upon the inside of the framework and the shovel and are located upon each side of the machine.

N' represents a series of buckets which are secured to the chains N at frequent intervals, and as the chains N are caused to travel in the directions of the arrows in Fig. 1 the buckets when they pass around the sprocket-wheels F will scoop up the dirt that is passing into the shovel, and as these buckets pass forward while the dirt is passing rearward in the shovel any obstructions—such as large stones, &c.—which the buckets may encounter will be forced forward, so as not to jam or injure the buckets or shovels in any manner. The buckets then after being filled will be carried around the sprocket-wheel G and upward, and after passing around the sprocket-wheels K' they will be tilted, so as to empty the contents of the bucket, because of the inclination of the chains in passing from the sprockets K' to the sprocket-wheels L'. Then after passing around the sprocket-wheels L' they will be carried back empty.

O represents chains, which are secured to the forward end of the shovel A and are adapted to be connected to a cart P. This cart is pulled forward and serves as the motive power for the shovel and also as a receptacle to receive the dirt. The buckets may be either emptied directly into the cart or a chute Q may be provided, which is secured to the arms J.

For the purpose of providing motive power to drive the chains and buckets a gear-wheel R is journaled loosely upon the shaft B, which shaft is adapted to be revolved by the traction-wheels C. Secured to the gear-wheel R is one member R' of a clutch. The other member R² is feathered upon the shaft B and is grooved for the purpose of receiving the forked end of an arm S. A link S' is connected to this arm, which extends through one side of the shovel and is connected to one end of an actuating-lever S². The handle of this lever extends rearward, so as to be in convenient reach of the person who is guiding the machine, and by rocking this lever the clutch can be thrown in or out of engagement when desired.

T is a gear-wheel which is secured upon the shaft F' and is adapted to mesh with the gear R, and thus the desired motion will be given to the chains N.

The advantage of this present invention over my former invention above mentioned is that the shovels are caused to revolve in the opposite direction and will be more easily filled because of working against the incoming dirt and the machinery will not become damaged by large stones or other obstructions, because the buckets will throw such obstructions forward, and thus the obstructions will not be carried rearward to jam or damage the buckets.

Of course I do not wish to be limited to the exact construction here shown, as slight modifications could be made without departing from the spirit of my invention.

Having thus fully described my invention, what I claim as new and useful is—

1. In an apparatus of the character described, two traction-wheels secured to a common axle, a shovel or scraper pivoted upon said axle, two sets of sprocket-wheels, shafts upon which said sprocket-wheels are secured, said shafts extending across the interior of the shovel and journaled in each side thereof, uprights extending upward from each side of the shovel, arms extending forward from said uprights, a series of sprocket-wheels journaled upon said uprights and arms, continuous link belts, a series of buckets secured to said link belts at intervals, said link belts adapted to pass around and underneath the sprocket-wheels upon the interior of the shovel, and around and over the sprocket-wheels in the uprights and arms, said sprocket-wheels arranged so as to give the proper inclination to the belts at a certain point to cause the buckets to be emptied, a chute carried by the framework into which the buckets are adapted to empty, a vehicle adapted to be secured to said shovel, the said chute adapted to convey the dirt to said vehicle, means for transmitting power from the traction-wheels to revolve certain sprocket-wheels around which the chain passes so as to cause the chains and buckets to travel forward against the incoming dirt, substantially as described and for the purpose specified.

2. In combination, a cart shovel and scraper, two traction-wheels C, a shaft B, the ends of which are secured to the traction-wheels, a shovel or scraper A mounted upon the shaft B, a shaft F', the ends of which are journaled upon the inside of the sides of the shovel, sprocket-wheels secured upon the shaft F', sprocket-wheels G journaled upon the interior of the shovel, uprights extending upward from the sides of the shovel, arms extending forward from said uprights, sprocket-wheels M and I' journaled in said uprights, sprockets K' and L' journaled in said arms, continuous link belts adapted to pass around all of said sprocket-wheels, a series of buckets carried by said link belts, a vehicle adapted to be secured to said shovel, a chute carried by the framework, said chute adapted to convey the dirt emptied from said buckets into said vehicle, a gear-wheel K journaled loosely upon the shaft B, a gear-wheel T secured upon the shaft F' and adapted to mesh with the gear-wheel R, a clutch feathered upon the shaft B and adapted to connect and disconnect the gear-wheel R with said shaft, means adapted to be operated from the exterior of the shovel for throwing said clutch in and out of engagement with the gear-wheel R, a handle secured to the rear end of the shovel for guiding the same, wheels D journaled in the forward end of the shovel upon each side thereof, substantially as described and for the purpose specified.

In testimony whereof I have hereunto affixed my signature in the presence of two subscribing witnesses.

ADAM GEHRINGER.

Witnesses:
  WARNER WEILAND,
  EDWIN STEARNE.